United States Patent
Beavin et al.

(10) Patent No.: US 8,060,495 B2
(45) Date of Patent: Nov. 15, 2011

(54) QUERY EXECUTION PLAN EFFICIENCY IN A DATABASE MANAGEMENT SYSTEM

(75) Inventors: Thomas A. Beavin, Milpitas, CA (US); Patrick D. Bossman, Alexandria, VA (US); You-Chin Fuh, San Jose, CA (US); Adarsh R. Pannu, San Jose, CA (US); Terence P. Purcell, New Berlin, IL (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 12/255,520

(22) Filed: Oct. 21, 2008

(65) Prior Publication Data

US 2010/0114868 A1 May 6, 2010

(51) Int. Cl.
G06F 17/30 (2006.01)

(52) U.S. Cl. .......................................... 707/718
(58) Field of Classification Search .............. 707/718
See application file for complete search history.

(56) References Cited

U.S. PATENT DOCUMENTS

| | | | |
|---|---|---|---|
| 5,940,819 A | 8/1999 | Beavin et al. | |
| 6,006,220 A | 12/1999 | Haderle et al. | |
| 6,219,660 B1 | 4/2001 | Haderle et al. | |
| 6,763,359 B2 * | 7/2004 | Lohman et al. | 707/718 |
| 6,985,904 B1 | 1/2006 | Kaluskar et al. | |
| 7,080,062 B1 | 7/2006 | Leung et al. | |
| 7,275,051 B2 | 9/2007 | Hrle | |
| 7,552,110 B2 | 6/2009 | Hrle et al. | |
| 2004/0019587 A1 | 1/2004 | Fuh et al. | |
| 2004/0039729 A1 | 2/2004 | Boger et al. | |
| 2004/0181521 A1 | 9/2004 | Simmen | |
| 2004/0243555 A1 | 12/2004 | Bolsius | |
| 2005/0065921 A1 | 3/2005 | Hrle et al. | |
| 2005/0091196 A1 | 4/2005 | Day et al. | |
| 2005/0097091 A1 | 5/2005 | Ramacher et al. | |
| 2005/0177557 A1 | 8/2005 | Ziauddin et al. | |
| 2006/0074874 A1 | 4/2006 | Day et al. | |
| 2006/0106839 A1 | 5/2006 | Shen et al. | |
| 2006/0129542 A1 | 6/2006 | Hinshaw et al. | |
| 2006/0212428 A1 | 9/2006 | Nelson | |
| 2007/0271218 A1 | 11/2007 | Lim et al. | |

(Continued)

OTHER PUBLICATIONS

Purcell et al., "Insurance for Your Access Paths Across REBINDS", Intelligent Optimizer, www.idug.org, pp. 37-39, available from as early as Nov. 20, 2007.
http://www.orafaq.com/wiki/Oracle_database_Performance_Tuning_FAQ <retrieved on Oct. 25, 2008>, See section: "My query was fine last week and now it is slow. Why?"

(Continued)

Primary Examiner — Cheryl Lewis
(74) Attorney, Agent, or Firm — Kunzler Needham Masssey & Thorpe

(57) ABSTRACT

An apparatus, system, and method are disclosed for improving query execution plan efficiency in a database management system. The present invention binds both static database queries and dynamic database queries to new query execution plans (QEPs) that produce the same result set as a former QEP bound to the database queries. Next, the present invention identifies one of the former QEPs and the new QEP as an active QEP and automatically collects execution statistics for one of the former QEPs and the new QEP. Finally, the present invention automatically selects one of the former QEPs and the new QEP as the active QEP in response to completion of the automatic collection of execution statistics, the active QEP selected such that the automatically selected QEP provides optimal execution performance based on performance criteria in comparison to the automatically unselected QEP, the active QEP selected based on the execution statistics.

20 Claims, 6 Drawing Sheets

U.S. PATENT DOCUMENTS

| | | |
|---|---|---|
| 2008/0104014 A1 | 5/2008 | Burger et al. |
| 2008/0133458 A1 | 6/2008 | Zabback et al. |
| 2008/0222093 A1 | 9/2008 | Fan et al. |
| 2009/0030888 A1 | 1/2009 | Sahu et al. |
| 2009/0049012 A1 | 2/2009 | Bossman et al. |
| 2009/0327214 A1 | 12/2009 | Richardson et al. |
| 2010/0114868 A1 | 5/2010 | Beavin et al. |
| 2010/0198808 A1 | 8/2010 | Graefe et al. |

OTHER PUBLICATIONS

Zhu et al. Building Multistates Cost Models for Dynamic Multidatabase Enivronments.

Office Action received from USPTO, U.S. Appl. No. 12/395,836, Mar. 18, 2011.

Final Office Action Received from USPTO, U.S. Appl. No. 12/395,836, Received Aug. 26, 2011.

\* cited by examiner

QUERY EXECUTION PLAN EFFICIENCY IN A DATABASE MANAGEMENT SYSTEM

BACKGROUND OF THE INVENTION

1. Field of the Invention

This invention relates to database management systems and more particularly relates to binding and rebinding of query execution plans to database queries.

2. Description of the Related Art

Both critical and non-critical transactions rely on database technologies to store, retrieve, update, and delete data. Database management systems (DBMS) such as Oracle, DB2, IMS, MYSQL, are highly tuned and carefully managed to ensure that database queries to the DBMS are serviced and returned as quickly as possible. These queries maybe made using various languages including SQL, XPATH, and the like. The database queries may be dynamic (meaning the query is generated as needed, the query having a form that is unknown until the query is received and likely to change between requests) or static (meaning the database query is predefined does not change form between requests, although the data values of the query may change).

Typically, a DBMS will store the text representing a database query and/or assign a unique identifier for the database query. The database query is then associated with a query execution plan (QEP) or access path, also referred to as a query execution path. This association is referred to as a binding. The QEP identifies a set of indexes, tables, caches, and other optimization aides that the DBMS references each time the DBMS receives a request to execute the database query associated with the QEP. By following the QEP for a database query, a DBMS can significantly reduce response times.

A database administrator (DBA), or other user tasked with maintaining and tuning the DBMS, uses an assortment of tools and technologies to influence a DBMS like DB2 to generate a QEP that optimizes the use of DBMS resources and minimizes the response times for the static database query. Various tools and algorithms exist for identifying inefficient QEPs and determining new QEPs that are expected to perform better. Significant time and expense has been spent working to ensure that the new QEP is in fact more efficient than a previous QEP.

Unfortunately, these tools and algorithms are unable to provide a 100% guarantee that the new QEP for a particular database query, whether static or dynamic, is optimal. When a new QEP is bound to a database query in place of an original QEP, and the new QEP performs less optimally than the original QEP, the QEP binding for the database query has regressed. Regression of QEP bindings with consequential reduced performance can be very costly to an organization in terms of lost reputation, failure to meet quality of service obligations, operations disruptions, time and expense in troubleshooting the matter, and the like.

Some of these factors contributing to one QEP performing differently from another include differences in database accesses (typically whether a table is accessed by an index or not, and if so, which one), differences in how data is joined, the amount of query traffic, the variety of traffic loads, user request patterns, hardware configurations, processing bottlenecks, I/O bottlenecks, and the like. The problem of QEP binding regression is further complicated because the effects of binding a new QEP to a particular static database query may not be determinable within a predictable period of time due to usage patterns and the like. In addition, the configuration of the DBMS is such that administrative actions taken to improve performance of one set of static database queries can adversely affect another unknown set of static database queries.

Some solutions exist for identifying when a QEP is regressive and for computing a new QEP that is predicted to provide more optimal performance than an original QEP. Unfortunately, these solutions still require the DBA to review the proposed new QEP and decide whether to bind the database query to the new QEP.

The DBA may need to consider bindings of new QEPs for hundreds or thousands of database queries. The DBA must weigh the potential performance improvement against the potential that the new QEP is in fact not an improvement. The results of this decision are typically not known until the decision is made and the effects are experienced. Consequently, a DBA is often very reluctant to perform a rebinding without more proof that there will not be a regression in DBMS performance.

To minimize the impact of regression, a DBA will not perform the rebinding, or if the rebinding is performed, the DBA is prepared to quickly revert to original QEPs for a database query if performance suffers.

SUMMARY OF THE INVENTION

From the foregoing discussion, it should be apparent that a need exists for an apparatus, system, and method that ensures query execution plan stability and efficiency in a database management system (DBMS). Beneficially, such an apparatus, system, and method would automatically monitor an original query execution plan (QEP) and a new QEP, determine which QEP is optimal and automatically use the most optimal QEP such that regressive QEPs are avoided and bound QEPs are stable in performance improvement.

The present invention has been developed in response to the present state of the art, and in particular, in response to the problems and needs in the art that have not yet been fully solved by currently available database query execution plan binding solutions. Accordingly, the present invention has been developed to provide an apparatus, system, and computer program product that ensures query execution plan stability in a database management system that overcomes many or all of the above-discussed shortcomings in the art.

A method for improving query execution plan efficiency in a database management system is presented, the method comprising receiving a qualified database query, the database query comprising one of a static database query and a dynamic database query; and retrieving a stored query execution plan (QEP) for the database query in response to a QEP repository associating the database query with an active QEP.

The method further comprises generating a new QEP for the database query in response the QEP repository failing to associate the database query with an active QEP, and storing the new QEP in the QEP repository, designating the new QEP as the active QEP, binding the active QEP to the database query; and satisfying the database query by implementing the active QEP.

The method, in one embodiment, also comprises a QEP repository that is configured to store the active QEP and at least one inactive QEP. In yet another embodiment, the method comprises rebinding one of the inactive QEPs stored in the QEP repository to the database query, and designating the bound inactive QEP as the active QEP in response to a user input.

The method may also include a database query that further comprises a hint that guides a QEP generation module in generating the new QEP. In other embodiments, the method includes an operation to compare the new QEP and one of the at least one inactive QEPs to produce comparison results. This embodiment of the method also comprises presenting the comparison results to a user; and marking one of the at least one inactive QEPs as the active QEP in response to a user input.

This embodiment of the method may be directed to a QEP repository wherein each QEP in the QEP repository comprises an activation timestamp. The method further comprises, in some embodiments, rebinding the database query to an inactive QEP in the QEP repository having a different timestamp than the currently active QEP, in response to performance criteria. In still further embodiments of the method in which the database query comprises a dynamic database query, the method comprises transforming the dynamic database query into a hash key using a hash function; and indexing the hash key in a hash table comprising one or more QEPs associated with dynamic database queries.

In one embodiment of the method, the QEP repository comprises one or more of stored inactive QEPs, active QEPs, executable forms, timestamps, query metadata, user supplied hints, and execution statistics. The database query may also comprise at least one parameter in a predicate of the database query, and in this embodiment the method further comprises binding a plurality of QEPs to the database query, such that each QEP in the plurality of QEPs is bound to the database query for a predetermined set of values of the at least one parameter in the database query. In yet another embodiment of the method, the plurality of QEPs are bound to the database query in response to a user input.

The method comprises, in a further embodiment, collecting execution statistics for the active QEP and a user-selected stored inactive QEPs, in response to user-defined criteria, storing the execution statistics in the QEP repository; and presenting the collected execution statistics to the user. In some embodiments the method also includes receiving a revert command from a user; and automatically rebinding the QEP identified as an active QEP with an inactive QEP last designated as an active QEP in response to the receiving the revert command.

A system is presented to improve query execution plan efficiency in a database management system, the system comprising a processor, a data storage means for storing data, in communication with the processor, a memory in communication with the processor, the memory comprising, a receiver module configured to receive a qualified database query, the database query comprising one of a static database query and a dynamic database query, a retriever module configured to retrieve a stored query execution plan (QEP) for the database query in response a QEP repository associating the database query with an active QEP, a generation module configured to generate a new QEP for the database query in response the QEP repository failing to associate the database query with an active QEP, and storing the new QEP in the QEP repository, and designating the new QEP as the active QEP The system also includes an execution module configured to bind the active QEP to the database query; and a selector module configured to select one of one or more inactive QEPs stored in the QEP repository as the active QEP in response to a user input, the inactive QEPs each formerly bound to the database query.

In some embodiments the system further comprises a statistics module configured to collect execution statistics for one or more of the active QEPs and one or more stored QEPs; and store the execution statistics in the QEP repository; and expose the user to the collected execution statistics. In other embodiments of the system, a plurality of QEPs are bound to the database query in response to a user input.

The system may also comprise an acceptor module configured to accept a user instruction to bind the database query to a QEP in the QEP repository that was active on a user-specified date, as well as a swap module configured to receive a revert command from a user; and automatically swap the QEP identified as an active QEP with an inactive QEP that was last designated as an active QEP in response to the receiving the revert command.

An apparatus for improving query execution plan efficiency in a database management system is also presented, the apparatus comprising: a receiver module configured to receive a qualified database query, the database query comprising one of a static database query and a dynamic database query; and a retriever module configured to retrieve a stored query execution plan (QEP) for the database query in response a QEP repository associating the database query with an active QEP.

The apparatus also includes a generation module configured to generate a new QEP for the database query in response the QEP repository failing to associate the database query with an active QEP, and storing the new QEP in the QEP repository, and designating the new QEP as the active QEP; and a binder module configured to bind the database query to the active QEP.

A computer program product is also presented comprising a computer readable medium having computer usable program code executable to perform operations for improving query execution plan efficiency in a database management system, the operations of the computer program product comprising: receiving a qualified database query, the database query comprising one of a static database query and a dynamic database query; and retrieving a stored query execution plan (QEP) for the database query in response a QEP repository associating the database query with an active QEP.

The operations of the computer program product claim further comprise generating a new QEP for the database query in response the QEP repository failing to associate the database query with an active QEP, and storing the new QEP in the QEP repository, and designating the new QEP as the active QEP; and binding the active QEP to the database query.

The computer program product may also comprise retrieving execution statistics for one or more of the active QEP, the new QEP and one or more inactive QEPs; and comparing the execution statistics. In some embodiments, the computer program product claim further comprises binding one or more of an inactive QEP and a new QEP to the database query in response to a user input.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
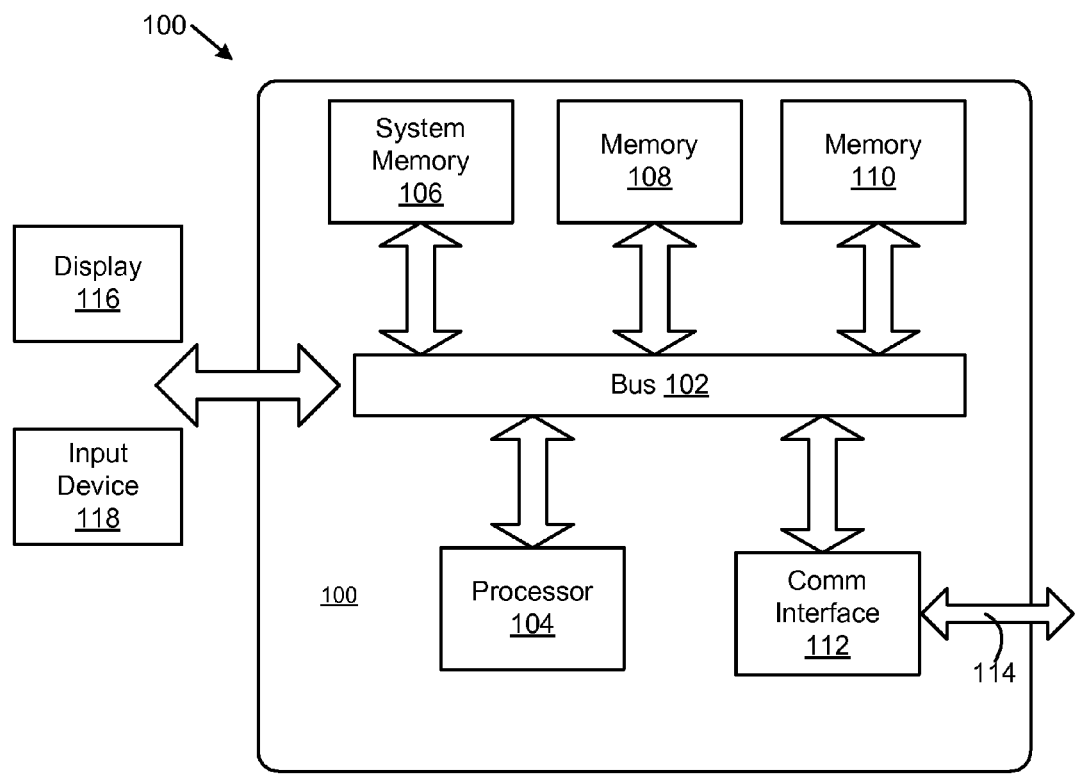
FIG. 1 is a schematic block diagram illustrating an exemplary system of hardware components capable of implementing embodiments of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, systems or networks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of generating machine readable data, causing machine readable data to be generated, or causing execution of a program of machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating an exemplary system 100 of hardware components capable of implementing embodiments of the present invention. The system 100 may include various systems and subsystems. The system 100 may be a personal computer, a laptop computer, a workstation, a computer system, an appliance, an application-specific integrated circuit ("ASIC"), a Personal Digital Assistant ("PDA"), a digital music player, a server, a server blade center, a server farm, a router, a switch, an appliance, a motor, an automotive system, an avionics system, or the like.

One of skill in the art will recognize other examples of electronic devices that may serve as the system 100.

The system 100 includes a system bus 102, a processor 104, a system memory 106, a memory 108, a memory 110, a communication interface 112, a communication link 114, a display 116, and an input device 118.

The system bus 102 is in communication with a processor 104 and a system memory 106. At least one additional memory 108, 110, such as a hard disk drive, server, stand alone database, or other non-volatile memory, may also be in communication with the bus 102. The bus 102 operably interconnects the processor 104, the memory devices 106-110, the communication interface 112, the display 116, and the input device 118. In some embodiments, the bus 102 also operably interconnects one or more additional ports. The ports may allow for connections with other resources or peripherals, such as printers, digital cameras, scanners, wireless devices, and the like.

The processor 104 is a computing device well-known to those in the art and may include an application-specific integrated circuit ("ASIC"). The processor 104 executes a set of instructions to implement the operations of embodiments of the present invention.

The additional memory devices 106, 108, 110 may be configured to store data, programs, instructions, database queries in text or compiled form, and any other information that may be needed to operate a processor or computer. The memories 106, 108, 110 may comprise computer-readable media (integrated or removable) such as a memory card, disk drive, compact disk (CD), or server accessible over a network. In certain embodiments, the memories 106, 108, 110 may comprise text, images, video, and/or audio, portions of which may be available in different human languages, such as English, French, Spanish, and the like.

Additionally, the memory devices 108, 110 may also serve as databases or datastores for relational database management systems (DBMS). Alternatively, the system 100 may be configured to access an external DBMS through the communication interface 112, which may be in communication with the system bus 102, and communication link 114.

The display 116 may be digital or analog. In some embodiments, the display may be a cathode ray tube ("CRT"), a liquid crystal display ("LCD"), a plasma display panel ("PDP"), a light emitting diode or series thereof ("LED"), or the like. Alternatively, or in addition, the display module 208 may include an audio speaker for providing audio information.

The input device 118 is an input device for interacting with a user. In some embodiments, the input device 118 comprises a keyboard, mouse, microphone, telephone, or another system or electronic device. The input device 118 may also accept output from the bus 102 in some embodiments.

In operation, system 100 may be used to implement a DBMS that provides results in response to a plurality of database queries. The DBMS may receive the database queries in accordance with various query database protocols include SQL, XQULERY, and the like. Computer executable logic for implementing the DBMS resides on one or more of the system memory 106, and the memory devices 108, 110 in accordance with certain embodiments of the present invention. The processor 104 executes one or more instructions originating from one or more of the system memory 106, and the memory devices 108, 110. The term "computer readable medium" as used herein refers to a medium that participates in providing instructions to processor 104 for execution.

Figure 2:
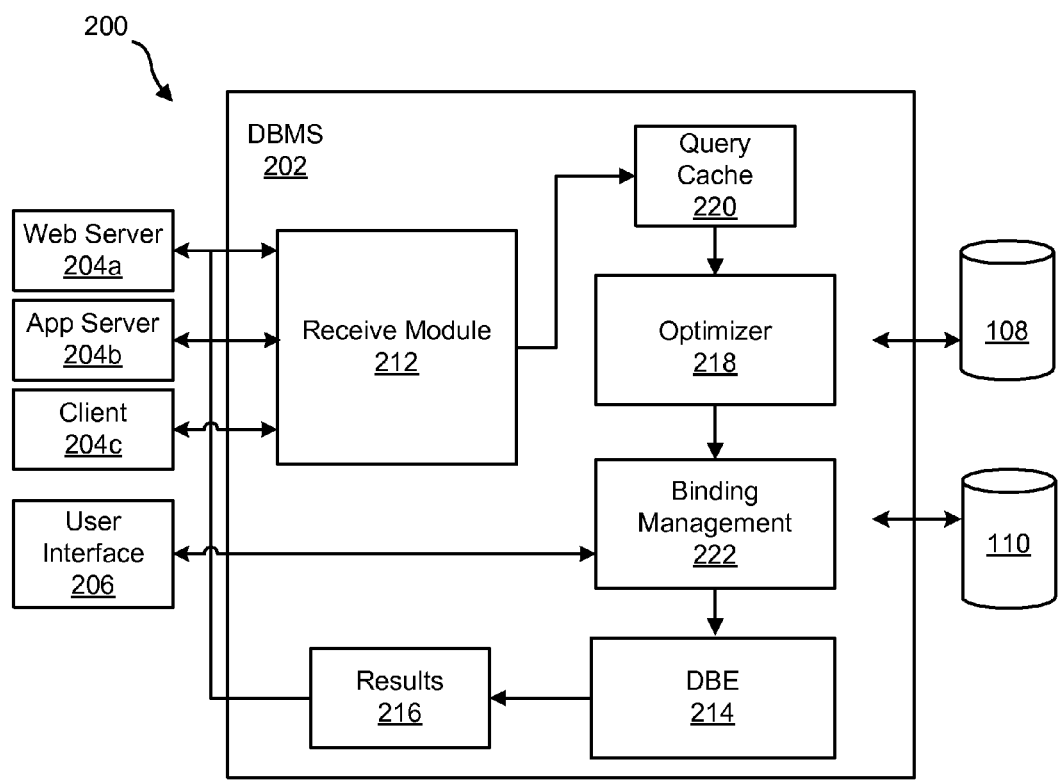
FIG. 2 is a schematic block diagram illustrating one embodiment of an system for improved query execution plan efficiency in a database management system in accordance with the present invention.

FIG. 2 is a schematic block diagram illustrating one embodiment of a system 200 for improved query execution plan efficiency in a DBMS 202 in accordance with the present invention. The system 200 includes a DBMS 202, one or more clients 204a-c in communication with the DBMS 202, a user interface (UI) 206.

The DBMS 202 communicates with the clients 204a-c, UI 206, and datastores 208a-b using various local or remote communications links such as wired and wireless network, communication busses and the like. The communication links implement various protocols including TCPIP, Fibre Channel, and the like.

The DBMS 202 is configured to respond to database queries by sending results as soon as possible. The DBMS 202, also referred to as a database server, responds to database queries from clients such as a web server 204a, an application server 204b, or a client 204c configured to issue requests in accordance with industry accepted formats and protocols. To provide optimal performance the DBMS 202 includes a variety of optimization components and aides for handling static and dynamic database queries.

The term "static database queries" as used herein refers to database queries that do not change between two subsequent requests for the same information. In other words, while the data values associated with query predicates may change between subsequent requests, the predicates and the fields of data requested do not change.

The term "dynamic database queries" as used herein refers to database queries that do change between two subsequent requests for the same information. In other words, both the data values associated with query predicates may change between subsequent requests, and the predicates and the fields of data requested may also change.

The DBMS 202 includes a receive module 212 and a database engine (DBE) 214. The receive module 212 and the database engine 214 cooperate to provide the basic functionality of the DBMS 202. The receive module 212 accepts database queries from the clients 204a-c. The receive module 212 parses the database queries and provides a query execution plan (QEP), or access path, to the DBE 214 for fulfilling the request. The database queries may be in computer executable format such as computer object code, script code, interpretive code, or the like. The QEP typically includes references to one or more query fulfillment aides such as indexes, caches, and the like. The DBE 214 follows the instructions to retrieve the requested data from the datastores or memory 108, 110.

The datastores 108, 110 comprise one or more storage devices configured to hold data in an organized manner that facilitates prompt retrieval, and are substantially described above in relation to FIG. 1.

The DBE 214 provides the results to a results module 216. The results module 216 packages the result data into a format compatible with the format requested by the client 204 and send the results to the client 204.

To increase the efficiency and minimize the response time of the DBMS 202, the DBMS 202 includes an optimizer 218 and a query cache 220. The optimizer 218 cooperates with the query receiver 212 to provide the most optimal set of retrieval instructions to the DBE 214 as possible. The optimizer 218 performs such functions as identifying that a database query is a static database query or a dynamic database query, caching of one or more QEPs in the query cache 220, mapping and/or hashing of static database queries and dynamic database query requests to corresponding QEPs based on QEP bindings, identifying QEPs that are inefficient, generating new QEP that use various indexes, and other optimization tools of the DBMS 202.

The query cache 220 stores QEPs and other DBMS related information that is likely to be needed in the near future. In one embodiment, the query cache 202 comprises volatile memory devices 108, 110.

The DBMS 202 also includes a binding management module 222. The binding management module 222 associates at least one QEP with a database query. Database queries include a predefined set of fields and one or more predicates. Predicate values may change between calls of the static database query but the format and structure remains unchanged. This static attribute of a static database query permits a QEP to be associated with a particular static database query as long as needed in some embodiments. In other embodiments, including those involving dynamic database queries, the binding management module 222 may associate dynamic and/or static database queries with one or more QEPs by hashing the database queries and indexing the hash keys in a hash table (this embodiment is discussed further below in relation to FIG. 4). This association, by whatever means it is effectuated, is referred to herein as a binding.

By binding static and dynamic database queries to at least one QEP the DBMS 202 saves the time and overhead of generating a QEP each time a request is received for the same database query. The receive module 212 and optimizer 218 cooperate to identify static and dynamic database queries that are bound to a QEP. The bound QEP is accessed and executed to fulfill the database query.

In one embodiment, the binding management module 222 permits a user or database administrator to control which database queries are bound to QEPs and allows both static and dynamic database queries to be bound to two or more QEPs with one of the two or more QEPs designated as a primary QEP, or active QEP. In other embodiments, the two or more QEPs bound to the database query are bound to the database query only for certain ranges of one or more predicate values. For instance, in a hypothetical example, a first QEP might be bound to database queries requesting employee profiles in the database with ages between twenty (20) years and fifty (50) years; while a second QEP is bound to the same database query, but only if the database query is requesting employees with ages over fifty (50) years. Whether the first and second QEPs are generated manually or automatically, or when QEPs are generated, is not relevant to all embodiments of the present invention.

The binder module 318 serves to establish a binding between each one of a plurality of database queries 316 and a plurality of defined QEPs 314. If a database query 316 is new, the database query 316 maybe bound to a single QEP 314. For database queries 316 that are already bound to a QEP 314, the binder module 318 may bind a new QEP 314 created by the generation module 308 to the database query 316 and may designate one of the two QEPs as the active QEP and the other QEP as secondary QEP in the QEP repository 312.

Figure 3A:
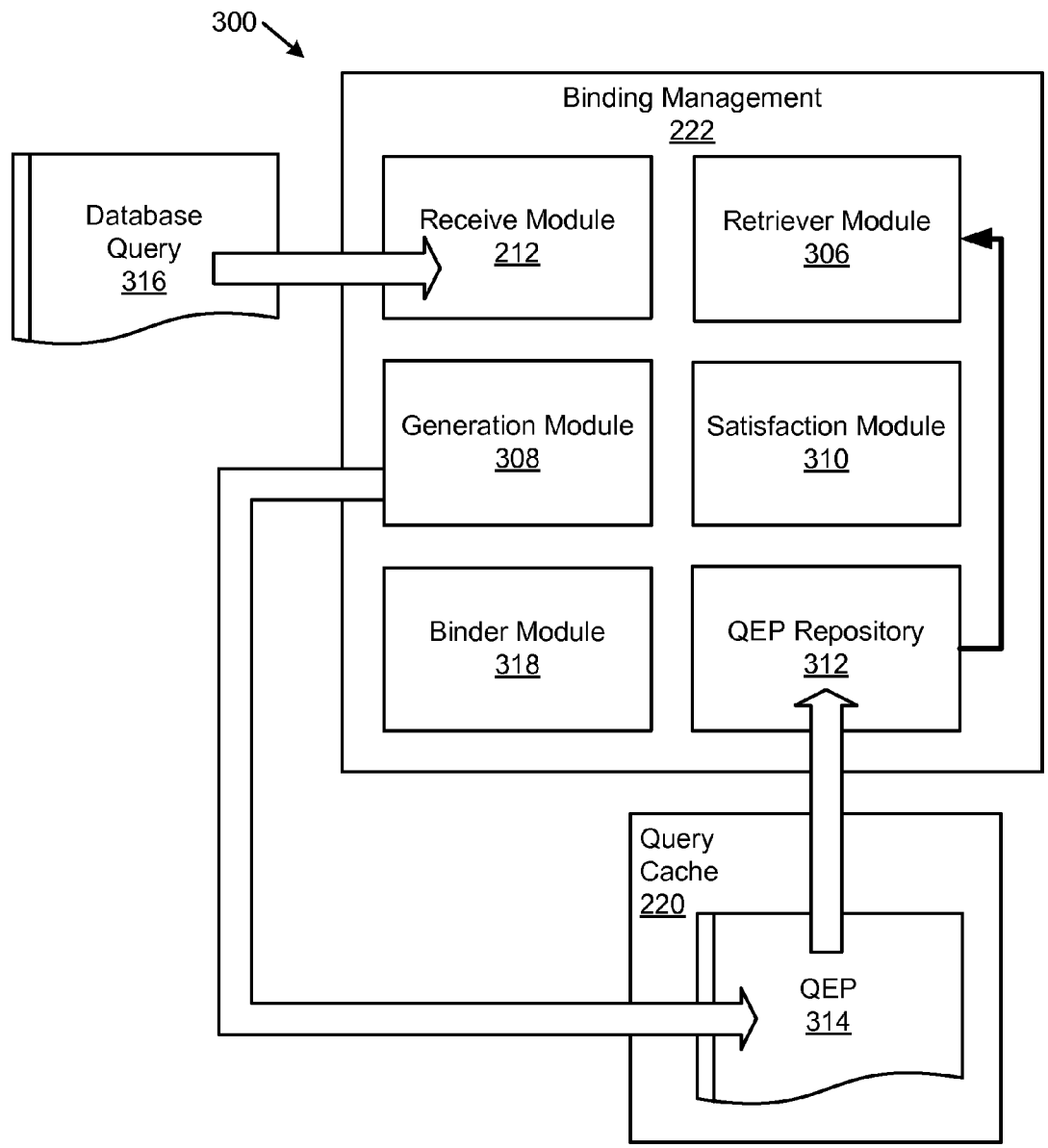
FIG. 3A is a schematic block diagram illustrating one embodiment of a binding management module for improving query execution plan efficiency in a database management system in accordance with the present invention.

FIG. 3A illustrates one embodiment of the binding management module 222 for improved query execution plan efficiency in a database management system in accordance with the present invention. The binding management module 222 manages the bindings between database queries (static and dynamic) and one or more QEPs. The binding management module 222 includes a receive module 212, a retriever module 306, a generation module 308, a satisfaction module 310, and a binder module 318. In this embodiment, the binding management module 222 also includes an internal QEP repository 312. The QEP repository may be external to the binding management module 222 in other embodiments.

The receive module 212 is configured to receive a static or dynamic database query 316 from a client 204a-c. In some embodiments, the receive module 212 accepts only "qualified" database queries 316. A qualified database query 316 is a database query that has been identified, through profiling mechanisms known to those of skill in the art, as being candidates for stabilization (e.g. using the profiling attribute STABALIZE in DB2 for z/OS 9 and later versions). The term "stabilize" or "stabilization" as used herein when describing a database query 316 denotes the act of binding the database query 316 to a QEP 314. In some embodiments, only database queries 316 that are frequently used are qualified. In other embodiments, database queries 316 which are likely, based on a predetermined criteria, to reference more than n database table indices are qualified, where 'n' is a quantity established by a database administrator (DBA), or optimized through experimentation.

The retriever module 306 searches the QEP repository 312 for stored QEPs bound, formerly bound, or associated with the database query 316 received by the receive module 212. The retriever module 306 retrieves one or more QEPs stored in the QEP repository 312 in response to the QEP repository 312 associating a QEP in the QEP repository 312 with the database query 316.

The generation module 308 generates a new QEP 314 through mechanisms well-known to those of skill in the art. If a database query 316 received by the receive module 212 has no QEP 314 associated with it in the QEP repository 312, the generation module 308 generates a new QEP 314. In the shown embodiment, this new QEP 314 is stored in the query cache 220 after generation, then copied into the QEP repository 312. The binder module 318 associates of the database query 316 with the QEP 314 in the QEP repository 312, query cache 220, RAM, or a datastore 108, 110.

The satisfaction module 310 satisfies the database query 316 by implementing the QEP 314 bound to the database query 316. The satisfaction module 310 retrieves data from the database stored in datastore 108,100 which satisfy the database query 316 through instructions specified in the QEP 314.

This QEP repository 312, in this embodiment, is housed within the binding management module 222. In other embodiments, the QEP repository 312 is external to the binding management module 222, and may comprise a computer readable medium, such the memory 108, 110.

The QEP repository 312 stores QEPs 314 bound to, formerly bound to, active or inactive, and otherwise associated with, or formerly associated with, dynamic and static database queries 316. In the preferred embodiment, the stored QEPs are stored on computer readable media. In some embodiments, the QEP repository 312 may comprise text, spreadsheets, graphs, images, video, and/or audio, portions of which may be available in different human languages, such as English, French, Spanish, and the like.

In some embodiments, the QEP repository 312 stores QEPs 314 within one or more computer readable files, including database files. The stored QEPs 314 may be ordered within database indices chronologically from their date of generation, or grouped in clusters with other stored QEP(s) bound to the same or similar database queries 316. More than one stored QEP 314 may be associated with a single database query 316. Database queries 316 may be stored in the QEP repository 312, or the QEP repository 312 may store other identifiers representing database queries, including constants, values, hashes, pointers, or data structures. Particularly in the case of dynamic database queries 316, hashes representing the dynamic database query 316 may associate the database query 316 with one or more QEP(s) 314 due to the less predicable format and length of dynamic database queries 316.

The QEP repository 312 may also comprises stored activation timestamps, which activation timestamps comprise information about the date and time a QEP 314 was bound or rebound to the database query, as well as information about when the QEP 314 was made inactive. The QEP repository may further comprise QEP performance criteria gathered by a statistics module described below, input from a DBA, or gathered through other means well-known to those of skill in the art. The performance criteria may include response time, execution overhead, and the like. The performance criteria can be predefined and/or automatically checked by the various modules described herein prior to, or in response to, binding, rebinding, or making inactive a QEP 314. The QEP repository 312 is further described below in relation to FIG. 4.

The performance statistics may optionally be discarded in order to conserve storage space. In addition or alternatively, inactive QEPs 314 may also be discarded to conserve storage space. The DBA may control through the user interface 206 whether to execute these storage space conservation actions. The QEP 314 is substantially described above. The database query 316 is substantially described above.

The binder module 318 creates the associations between a database query and one or more QEPs. The association may be in the form of a pointer or other indicator identifying the QEP within a hash table, database table, index, or data structure. In certain embodiments, the text of the database query is not retained. Instead, a unique identifier, or hash key, representing the database query may be generated and/or assigned by the optimizer 218 or the generation module 308. The actual text defining the database query may be discarded or retained in a datastore 108, 110.

In addition, if the binder module 318 is instructed to bind the database query 316 to a new QEP 314 and the database query 316 is currently stabilized, or bound, to a QEP 314, the binder module 318 may generate a subsequent binding between the database query 316 and a new QEP 314 generated by the generation module 308. This subsequent binding, or stabilization, of the database query 316 may allow a DBA to test execution statistics for a variety of QEPs. In contrast to conventional DBMSs, the binder module 318 binds a database query 316 to two or more QEPs 314 simultaneously. Of course, the new QEP 314 generates the same query result as the concurrently, or previously, bound QEP 314. Advantageously, the DBMS may use any of the bound QEPs stored in the QEP repository 312 to fulfill the database query 316.

Figure 3B:
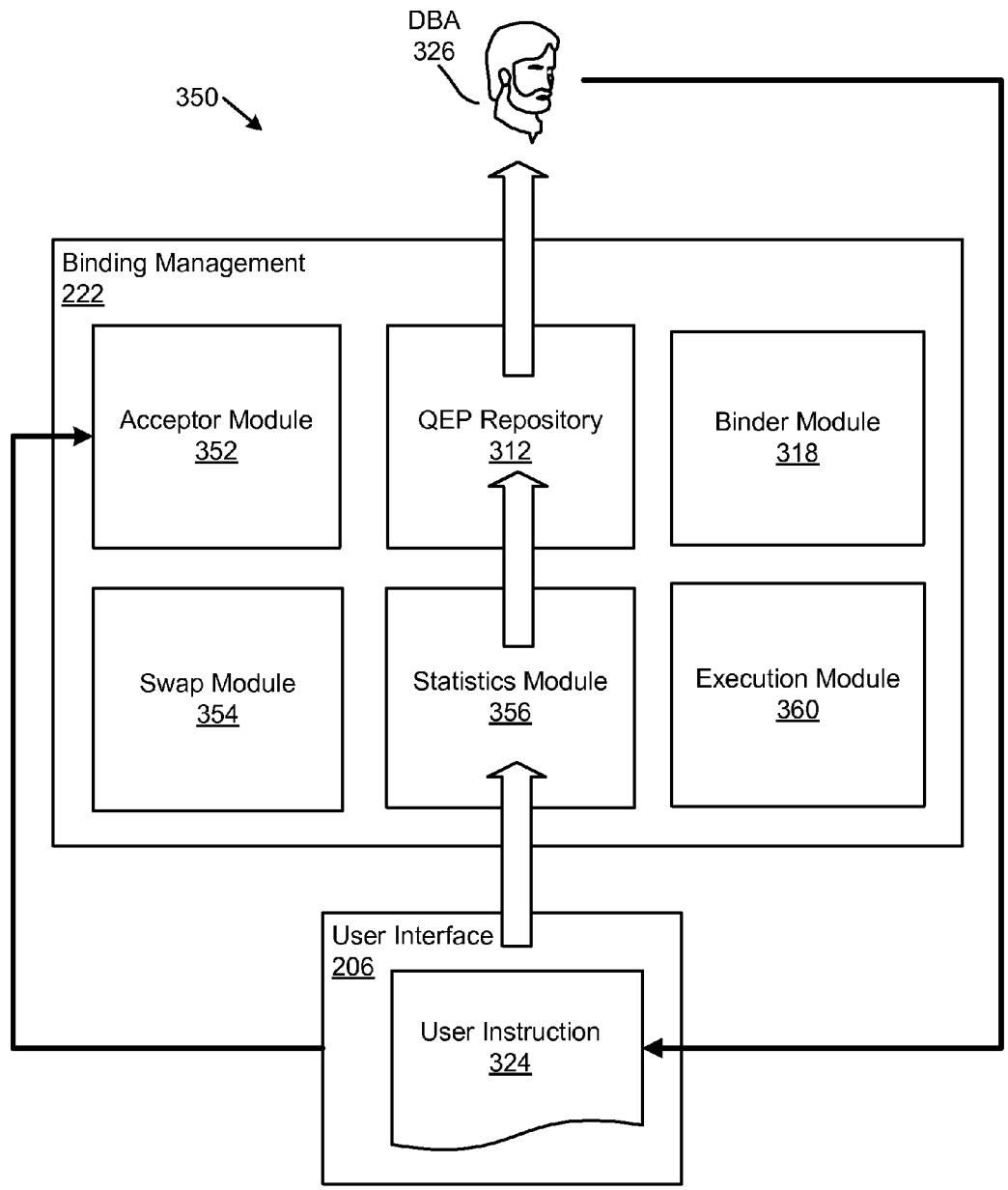
FIG. 3B is a schematic block diagram illustrating components that support a binding management module for improving query execution plan efficiency in a database management system in accordance with an embodiment of the present invention.

FIG. 3B illustrates a second embodiment of the binding management module 222 for improved query execution plan efficiency in a database management system in accordance with the present invention. The binding management module 222 includes a QEP repository 312, a binder module 318, an acceptor module 352, a swap module 354, a statistics module 356, and an execution module 360. In this embodiment, the binding management module 222 also interfaces with a user interface 206 and receives a user input 324 from a database administrator (DBA) 326.

The QEP repository 312 is substantially described above in relation to FIG. 3A and below in relation to FIG. 4.

The acceptor module 352 is configured to impart functionality to a device, system or apparatus that causes the same to accept a user instruction 324 to bind or rebind the database query 316 to a QEP 314 in the QEP repository 312. In some embodiments, the user instruction 324 may simply comprise a user-specified date, which date maybe interpreted as a command to rebind one or more QEP(s) 314 to the database query(ies) 316 that were active on the user-specified date. In some embodiments, the acceptor module 352 interfaces with the one or more of the swap module 354, the binder module 318, the designation module 360, the retriever module 306, the satisfaction module 310, the execution module 360, and the generation module 308 to effectuate the rebinding operation mandated by the user instruction 324.

The swap module 354 is configured to receive a revert command from a user or DBA 326 and automatically swap a QEP 314 identified as an active QEP 314 with an inactive QEP 314 that was last designated as an active QEP 314 in response to the receiving the revert command from another module or the DBA 326. In some embodiments, if the performance statistics associated with an inactive QEP 314 in the QEP repository 312 indicate that the performance of the inactive QEP 314 exceeds that of a new QEP 314 or an active QEP 314, the binder management module 318 may automatically swap the inactive QEP 314 with either the active QEP 314 or a new QEP 314 generated by the generation module 308. Alternatively, certain embodiments may permit a DBA 326 to indicate whether or not to make the swap automatically.

The statistics module 356 serves to collect execution statistics such that a determination can be automatically made whether to keep the original designation of an active QEP 314 or to switch the designation of the active QEP 314 to inactive, or to switch its status with another QEP 314. The statistics module 356 may manage an automatic performance regression avoidance phase. During this phase the statistics module 356 collects sufficient performance data (statistics) to enable other modules to make a determination regarding which QEP 314 to bind or rebind to the database query 316.

In one embodiment, the statistics module 356 uses a status indicator. The status indicator may tracks the state of the automatic performance regression avoidance phase.

In one embodiment, the statistics module 356 cooperates with the database engine (DBE) 214 to gather the execution statistics. In another embodiment, the statistics module 356 automatically gathers execution statistics during normal online operation of the DBMS 202. Alternatively, DBA 326 controlled parameters may require the statistics module 356 to gather statistics during off-peak time periods.

Those of skill in the art will recognize that an active QEP 314 in the QEP repository 312 may be selected for statistics collection first and then an inactive QEP 314 in the QEP repository 312 may be selected for statistics collection and comparison with the active QEP 314. Once the statistics module 356 collects performance statistics for both an active QEP 314 and an inactive QEP 314, a determination may be automatically made by the DBMS 202 regarding which of the active and inactive QEP 314 to bind or rebind to a database query 316 to provide the optimal execution performance for the given SDQ 314. Alternatively, the performance statistics may be displayed on a display 116 to a DBA 326 who instructs via a user instruction 324 the DBMS 202 which QEP 314 to bind.

The execution module 360 executes the static or dynamic database query 316 using the active QEP 314 bound to the database query 316 in the QEP repository 312. The execution module 360 returns results 216 to one or more clients 204a-c.

Figure 4:
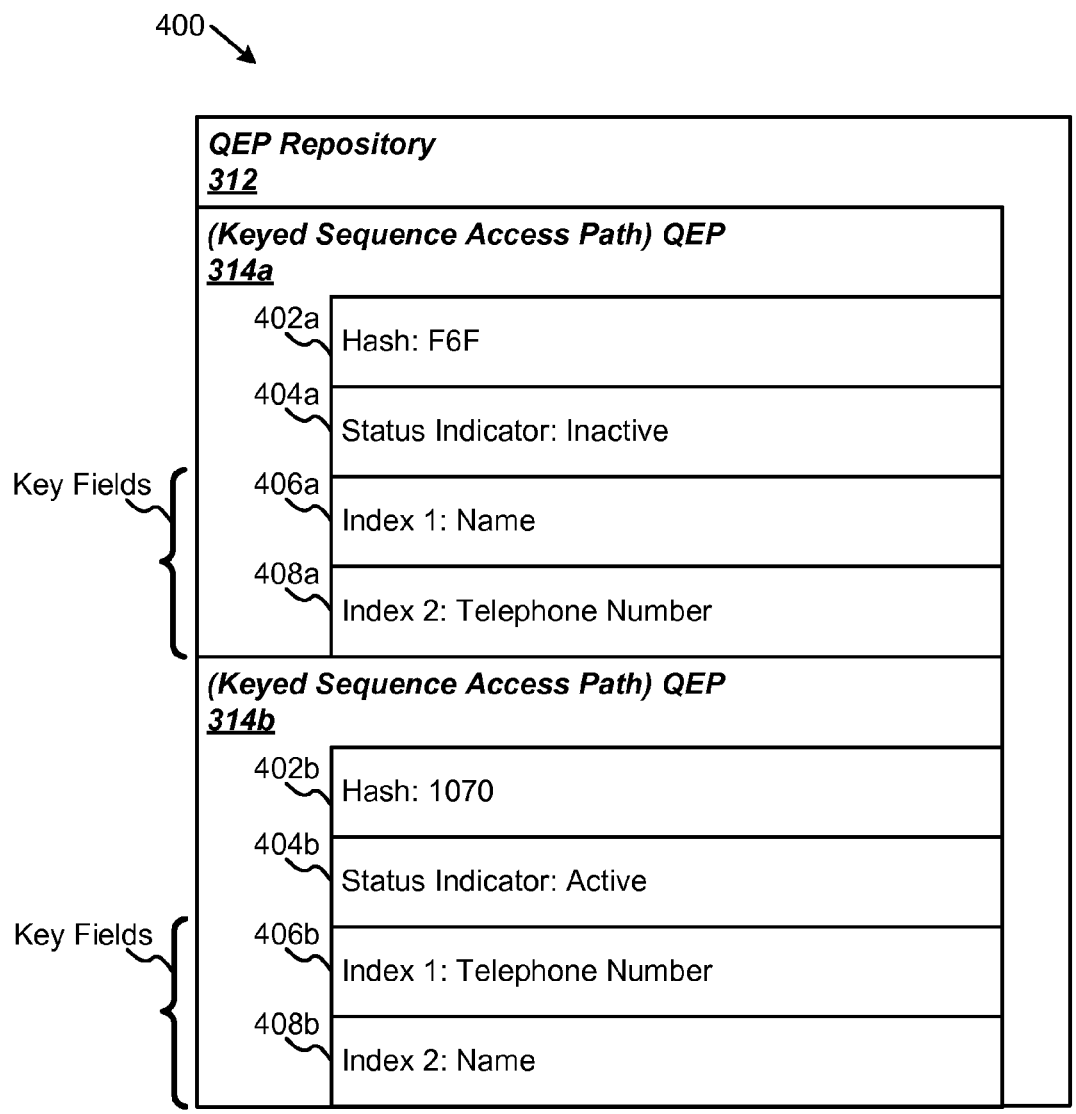
FIG. 4 is a diagram illustrating one embodiment of a QEP repository comprising multiple QEPs structured within a computer readable file.

FIG. 4 is a diagram illustrating one embodiment of a QEP repository comprising multiple QEPs structured within a computer readable file 400. The QEP repository 312 in this embodiment includes QEP 314a and QEP 314b.

The QEPs 314a-b, in this embodiment, comprise keyed sequence access path QEPs, which are well-known to those of skill in the art. The shown QEPs 314a-b each comprise four stored values: a hash 402, a status indicator 404, a first index 406, and a second index 408.

The hash value 402 is determined by a hash algorithm that "hashes" a dynamic or static database query 316. The hash 402 represents the database query 316 for the purposes of the QEP repository 312 in the shown embodiment 400. Hashes and hash algorithms are well-known to those of skill in the art. In the shown embodiment, the hashes 402a-b represent dynamic database queries 316, but may represent static database queries 316 in other embodiments.

The status indicator 404 indicates the status of the QEP 314 with respect to the database query 316 with which the QEP 314 is bound or associated. The QEP repository 312 stores both active and inactive QEPs 314. The inactive QEPs 314 may comprise QEPs 314 formerly bound to the database query 316, generated by the generation module 308 but never bound, or otherwise created or accepted for binding or performance testing. The status indicator 404 indicates whether a QEP 314 is active, or currently bound to the database query 316 represented by the hash 402.

The indices 406, 408 list database indices that should be searched, and the order in which they should be searched, to satisfy the database query 316. In the shown embodiment, QEP 314b is currently bound to the database query 316 identified by hash 402b as "1070" in hexadecimal. This QEP 314b will used by the execution module 360 to satisfy the database query 316, and satisfaction will begin by first searching index 406b; which, in the shown embodiment is a database table with a key consisting of sequentially ordered telephone numbers. The execution module 360 will then search the database table specified in index 408b; which, in this embodiment is a database table whose key is populated with name information. Those of skill in the art will recognize that there are other formats of QEPs 314 which may be incorporated into the present invention in addition to keyed sequence access path QEPs.

The keyed sequence access path 314a might be processed by a program PRGRM in IBM's DB2 for z/OS 9 through the following commands:

```
OVRDBF    FILE(314a)      SHARE (*YES)
OPNQRYF   FILE(314a)      KEYFLD("406, 408")
CALL      PGM(PRGRM)
CLOF      OPNID(314a)
DLTOVR    FILE(314a)
```

In this example, the database records are searched in the order specified by a file passed as the parameter in the KEYFLD command. In this example, the KEYFLD command accepts a file that refers to indices 406,408 in QEP 314a of FIG. 350. Those of skill in the will recognize many ways of arranging the records in keyed sequence access paths 314 and methods of processing these arrangements through the KEYFLD commands and other similar commands.

Figure 5:
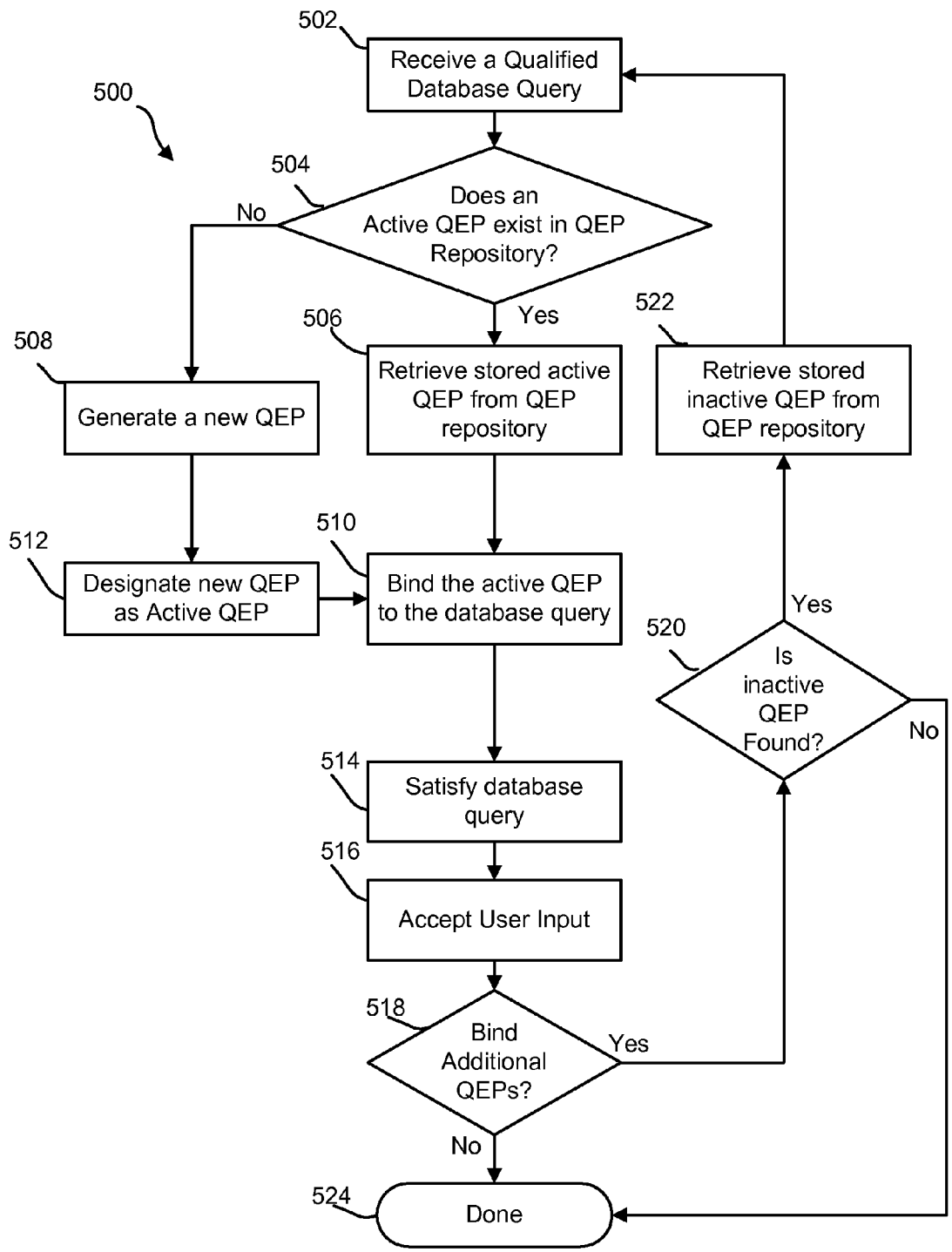
FIG. 5 is a schematic flow chart diagram illustrating one embodiment of a method for improving query execution plan efficiency in a database management system in accordance with the present invention.

FIG. 5 is a schematic flow chart diagram illustrating one embodiment of a method for improving query execution plan efficiency in a database management system in accordance with the present invention. The method 500 begins 502 for a database query 316 when the DBMS 202 receives a qualified database query 316. If the database query 316 is not qualified, the method 500 may be bypassed.

The acceptor module 352 receives 502 a qualified database query 316 and the retriever module 306 proceeds to determine 504 whether an active QEP 314 exists in the QEP repository 312. If an active QEP 314 does exist in the QEP repository 312, the retriever module 306 retrieves 506 the active QEP 314 from the QEP repository 312, then the method 500 proceeds 510.

If an active QEP 314 does not exist in the QEP repository 312, the generation module 308 generates 508 a new QEP 314 and the swap module 354 designates 512 the new QEP 314 as the active QEP 314. The method 500 then proceeds at 510.

At 510, the binder module 510 binds the active QEP 314 to the database query 316, then the satisfaction module 310 satisfies 514 the database query 316 and returns the results 216 to the client(s) 204 before proceeding to 516. In certain embodiments, the binding management module 222 determines whether sufficient performance statistics exist before binding the active QEP 314 to the database query 316. The performance statistics of the active QEP 314 may be automatically contrasted with the performance statistics of one or more inactive QEPs 314, or the method 500 may prompt a DBA 326 to manually determine whether sufficient performance statistics exist.

At 516, the DBMS 202 prompts a user or DBA 326 for input and accepts 516 the user input or user instruction 324. If the DBA 326 has instructed the DBMS 202 to bind additional QEPs 314, the retriever module 306 checks the QEP repository 312 for an inactive QEP 316 associated with, or formerly associated with, the database query 316. If there are no inactive QEPs 314 in the QEP repository 312, the method 500 ends 524. If there is an inactive QEP 314 associated with the database query 316, the method 500 begins again by receiving 502 the inactive QEP 314 from the QEP repository 312.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for improving query execution plan efficiency in a database management system, the method comprising:
   receiving a qualified database query, the database query comprising one of a static database query and a dynamic database query;
   retrieving a stored query execution plan (QEP) for the database query in response to a QEP repository associating the database query with an active QEP;
   generating a new QEP for the database query in response the QEP repository failing to associate the database query with an active QEP, and storing the new QEP in the QEP repository, designating the new QEP as the active QEP, binding the active QEP to the database query; and
   satisfying the database query by implementing the active QEP.

2. The method claim 1, wherein the QEP repository is configured to store the active QEP and at least one inactive QEP, the method further comprising rebinding one of the at least one inactive QEPs stored in the QEP repository to the database query, and designating the bound inactive QEP as the active QEP in response to a user input.

3. The method of claim 2, wherein the database query further comprises a hint that guides a QEP generation module in generating the new QEP.

4. The method of claim 2, further comprising:
comparing the new QEP and one of the at least one inactive QEPs to produce comparison results;
presenting the comparison results to a user; and
marking one of the at least one inactive QEPs as the active QEP in response to a user input.

5. The method of claim 2, wherein each QEP in the QEP repository comprises an activation timestamp, the method further comprising rebinding the database query to an inactive QEP in the QEP repository having a different timestamp than the currently active QEP, in response to performance criteria.

6. The method of claim 1, wherein the database query comprises a dynamic database query, the method further comprising
transforming the dynamic database query into a hash key using a hash function; and
indexing the hash key in a hash table comprising one or more QEPs associated with dynamic database queries.

7. The method of claim 1, wherein the QEP repository comprises one or more of stored inactive QEPs, active QEPs, executable forms, timestamps, query metadata, user supplied hints, and execution statistics.

8. The method of claim 1, wherein the database query comprises at least one parameter in a predicate of the database query, the method further comprising binding a plurality of QEPs to the database query, such that each QEP in the plurality of QEPs is bound to the database query for a predetermined set of values of the at least one parameter in the database query.

9. The method of claim 8, wherein the plurality of QEPs are bound to the database query in response to a user input.

10. The method of claim 1, further comprising:
collecting execution statistics for the active QEP and a user-selected stored inactive QEPs, in response to user-defined criteria;
storing the execution statistics in the QEP repository; and
presenting the collected execution statistics to the user.

11. The method of claim 1, further comprising:
receiving a revert command from a user; and
automatically rebinding the database query such that an inactive QEP last designated as an active QEP becomes the active QEP in response to the receiving the revert command.

12. A system to improve query execution plan efficiency in a database management system, the system comprising:
a processor;
a data storage device for storing data, in communication with the processor;
a memory in communication with the processor, the memory comprising,
a receiver module configured to receive a qualified database query, the database query comprising one of a static database query and a dynamic database query;
a retriever module configured to retrieve a stored query execution plan (QEP) for the database query in response a QEP repository associating the database query with an active QEP;
a generation module configured to generate a new QEP for the database query in response the QEP repository failing to associate the database query with an active QEP, and storing the new QEP in the QEP repository, and designating the new QEP as the active QEP;
an execution module configured to bind the active QEP to the database query; and
a selector module configured to select one of one or more inactive QEPs stored in the QEP repository as the active QEP in response to a user input, the inactive QEPs each formerly bound to the database query.

13. The system of claim 12, further comprising a statistics module configured to:
collect execution statistics for one or more of the active QEPs and one or more stored QEPs;
store the execution statistics in the QEP repository; and
expose the user to the collected execution statistics.

14. The system of claim 13, wherein a plurality of QEPs are bound to the database query in response to a user input.

15. The system of claim 13, further comprising an acceptor module configured to accept a user instruction to bind the database query to a QEP in the QEP repository that was active on a user-specified date.

16. The system of claim 13, further comprising a swap module configured to:
receive a revert command from a user; and
automatically swap the QEP identified as an active QEP with an inactive QEP that was last designated as an active QEP in response to the receiving the revert command.

17. An apparatus for improving query execution plan efficiency in a database management system, the apparatus comprising:
a receiver module configured to receive a qualified database query, the database query comprising one of a static database query and a dynamic database query;
a retriever module configured to retrieve a stored query execution plan (QEP) for the database query in response a QEP repository associating the database query with an active QEP;
a generation module configured to generate a new QEP for the database query in response the QEP repository failing to associate the database query with an active QEP, and storing the new QEP in the QEP repository, and designating the new QEP as the active QEP; and
a binder module configured to bind the database query to the active QEP.

18. A computer program product comprising a computer readable medium having computer usable program code executable to perform operations for improving query execution plan efficiency in a database management system, the operations of the computer program product comprising:
receiving a qualified database query, the database query comprising one of a static database query and a dynamic database query;
retrieving a stored query execution plan (QEP) for the database query in response a QEP repository associating the database query with an active QEP;
generating a new QEP for the database query in response the QEP repository failing to associate the database query with an active QEP, and storing the new QEP in the QEP repository, and designating the new QEP as the active QEP; and
binding the active QEP to the database query.

19. The computer program product of claim 18, further comprising:
retrieving execution statistics for one or more of the active QEP, the new QEP and one or more inactive QEPs; and
comparing the execution statistics.

20. The computer program product of claim 18, further comprising binding one or more of an inactive QEP and a new QEP to the database query in response to a user input.

* * * * *